United States Patent [19]
Mushika et al.

[11] Patent Number: 5,761,186
[45] Date of Patent: Jun. 2, 1998

[54] DISK CENTERING DEVICE

[75] Inventors: Yoshihiro Mushika, Neyagawa; Yoshikazu Goto, Hirakata; Yoshiteru Namoto, Ikoma; Hitoshi Fujii, Hirakata, all of Japan

[73] Assignee: Matsushita Electric Industrial Co., Ltd., Kadoma, Japan

[21] Appl. No.: 584,613

[22] Filed: Jan. 11, 1996

[30] Foreign Application Priority Data

Jan. 13, 1995 [JP] Japan .................. 7-004083

[51] Int. Cl.$^6$ .................................. G11B 17/028
[52] U.S. Cl. ........................ 369/271; 360/99.12
[58] Field of Search ........................ 369/270, 271, 369/282; 360/99.05, 99.12

[56] References Cited

U.S. PATENT DOCUMENTS

| | | | |
|---|---|---|---|
| 4,484,321 | 11/1984 | Eisemann | 369/270 |
| 4,730,300 | 3/1988 | Kamoshita et al. | 369/270 |
| 4,787,079 | 11/1988 | Ueno | 369/270 |
| 4,791,624 | 12/1988 | Stinesen | 369/270 |
| 4,827,470 | 5/1989 | Odawara et al. | 369/271 |
| 4,951,277 | 8/1990 | Masunaga et al. | 369/271 |
| 5,501,760 | 3/1996 | Mukawa | 369/270 |

*Primary Examiner*—Stuart S. Levy
*Assistant Examiner*—David L. Ometz
*Attorney, Agent, or Firm*—Renner, Otto, Boisselle & Sklar, P.L.L.

[57] ABSTRACT

The disk centering device of the invention includes: a turntable for retaining an information recording disk which has a center hole and is placed on a placing surface so that the disk can rotate around a rotation axis thereof; and a centering unit including a plurality of centering portions coming into contact with a periphery of the center hole and a plurality of resilient portions, each of which is connected with a corresponding one of the plurality of centering portions for supporting the centering portion so that the centering portion can be resiliently displaced in a radial direction of the information recording disk. In the disk centering device, the turntable includes regulating faces for regulating positions of the centering portions in a state where the centering portions are resiliently displaced in the radial direction as a result of a contact between the centering portions and the regulating faces, and each of the centering portions is in contact with the periphery of the center hole at a disk contact part which is located at a position more distant from the resilient portion than the regulating face.

14 Claims, 9 Drawing Sheets

Error of Disk Centering Position

Error of Disk Centering Position

1

DISK CENTERING DEVICE

BACKGROUND OF THE INVENTION

1. Field of the Invention

The present invention relates to a disk centering device for loading an information recording disk after positioning the disk with high precision.

2. Description of the Related Art

In general, an information recording disk such as a compact disk (CD) is provided with a hole for positioning itself at the center thereof, through which such a disk is centered and loaded in a disk driving apparatus. In order to make an optical pickup satisfactorily follow the recording tracks and improve the reliability of the pickup during recording and reproduction operations, it is important to improve the centering precision.

Methods for centering an information recording disk can be roughly classified into those using taper cones, those using resilient claws, and the like. By employing a method using resilient claws, in particular, the configuration of the centering device can be advantageously simplified. In addition, the method is suitable for reducing the thickness of a turntable. Such a disk centering device using a resilient claw is disclosed, for example, in U.S. Pat. No. 4,514,839. A conventional disk centering device will be exemplified with reference to FIG. 8.

FIG. 8 is a cross-sectional view showing an exemplary configuration for a conventional disk centering device.

As shown in FIG. 8, a resilient claw 103 including: a base portion 103a; an inner limb portion 103b; and an outer limb portion 103c are engaged into an undercut portion 101a of a turntable 101. In the state where a disk 100 is not loaded yet, an outer wall 103d of the outer limb portion 103c is positioned by a regulating face 101b of the turntable 101, and an initial elastic force outwardly acting on and thrusting the regulating face 101b is applied to the outer wall 103d. In this state, the outer wall 103d is located along the circumference, of which the radius from the rotation center axis ZZ of the turntable 101 is sufficiently larger than the radius of the center hole of the disk 100. More specifically, when the radius of the center hole of the disk 100 is defined to be in the range of 7.50 to 7.55 mm, the outer wall 103d is positioned by the regulating face 101b so that the outer wall 103d is located on the circumference having a radius of 7.8 mm or more.

Once the disk 100 is loaded as shown in FIG. 8, the outer wall 103d presses the periphery 100a of the center hole of the disk 100, thereby centering the disk 100.

However, the above-described disk centering device has the following two problems to be described below. Both of these two problems deteriorate the eccentricity precision of the disk.

The first problem lies in that the positional precision of a contact point between the periphery 100a of the center hole of the disk and the outer wall 103d is likely to be affected by the size precision of the entire resilient claw 103. Therefore, even when the regulating face 101b is positioned with high precision, the eccentricity precision in loading the disk cannot be satisfactorily improved. This problem will be described in detail with reference to FIGS. 9A to 9C.

FIGS. 9A to 9C illustrate the contact states of the resilient claw 103 and the turntable 101.

The resilient claw 103 is positioned by the regulating face 101b, as described above. However, in the case where the size precision of the resilient claw 103 is poor because of a process error or the like, the resilient claw 103 comes into contact with the regulating face 101b in three different states as shown in FIGS. 9A to 9C depending upon where the contact point exists; i.e., whether the contact point between the outer wall 103d and the regulating face 101b exists in an upper portion of the face 101b or a lower portion of the face 101b. As a result, the periphery 100a of the center hole of the disk 100 comes into with the outer wall 103d at three different points A to C and an error is also caused when the disk comes into contact with the claw 103. Accordingly, the contact point between the resilient claw 103 and the disk 100 is affected by the precision in processing the resilient claw 103 and becomes inconstant. Consequently, even when the regulating face 101b is positioned with high precision, the eccentricity precision in loading the disk becomes disadvantageously unstable.

Next, a second problem will be described with reference to FIG. 8 again.

The second problem is caused by the disequilibrium between the force acting on the centered disk for returning the disk to a center position (hereinafter, such force will be referred to as a "centering force") and the force exerted by the outer limb portion 103c on the periphery 100a of the center hole of the disk for resiliently thrusting the periphery 100a outwardly in the radial direction (hereinafter, such force will be referred to as an "elastic force"). More specifically, the centering force is far smaller than the elastic force. Accordingly, a sufficiently large centering force cannot be obtained and therefore the eccentricity precision in loading the disk cannot be well improved.

First, the magnitude of the centering force in a conventional centering device will be described. The centering force is generated owing to the elastic force of the outer limb portion 103c but the magnitude of the centering force is not equal to that of the elastic force. When the disk 100 is located at an ideally centered position, i.e., when the disk 100 has no eccentricity, the elastic forces of the respective outer limb portions 103c are in an equilibrium state, so that the centering force is zero. However, once the disk 100 has some eccentricity, the equilibrium among the elastic forces of the respective outer limb portions 103c is lost. As a result, a centering force equal to the difference among these forces is caused. Accordingly, the centering force is considerably smaller than the elastic forces of the outer limb portions 103c and is proportional to the spring constant and the eccentricity of the outer limb portions 103c.

The maximum value of the elastic forces of the outer limb portions 103c is determined by various conditions such as an insertion load in loading the disk 100 and the like and the centering force is far smaller than the elastic forces as described above. Therefore, in general, a centering force large enough to satisfactorily improve the eccentricity precision cannot be obtained and the eccentricity precision in loading the disk becomes poor. In order to solve such a problem, (though not shown in FIG. 8), a columnar wall surface having a radius smaller than that of the center hole of the disk 100 has conventionally been provided in the center portion of the turntable, thereby restricting the maximum value of the eccentricity of the disk. However, in actuality, since the centering force is small as described above, the disk comes to have some eccentricity in many cases before the disk comes into contact with the columnar wall surface.

Naturally, the radius of the center hole of a disk 100 is variable between a minimum radius and a maximum radius which are defined by the standards. Accordingly, in the case of loading a disk having a radius almost as large as the maximum radius, the disk comes to have a large eccentricity.

As a result, in a centering method using resilient claws, it is conventionally very difficult to constantly reduce the eccentricity of a disk to an eccentricity based on a common difference of the radius of the disk, e.g., ±0.05 mm =±50 μm in the case of using the disk 100, or less.

SUMMARY OF THE INVENTION

The disk centering device of the invention includes: a turntable for retaining an information recording disk which has a center hole and is placed on a placing surface so that the disk can rotate around a rotation axis thereof; and a centering unit including a plurality of centering portions coming into contact with a periphery of the center hole and a plurality of resilient portions, each of which is connected with a corresponding one of the plurality of centering portions for supporting the centering portion so that the centering portion can be resiliently displaced in a radial direction of the information recording disk. In the disk centering device, the turntable includes regulating faces for regulating positions of the centering portions in a state where the centering portions are resiliently displaced in the radial direction as a result of a contact between the centering portions and the regulating faces, and each of the centering portions is in contact with the periphery of the center hole at a disk contact part which is located at a position more distant from the resilient portion than the regulating face.

In one embodiment, the centering portions are made of a resin material, the resilient portions are made of a metallic spring material, and the centering portions and the resilient portions are integrally formed by an insert molding.

In another embodiment, a connection portion between each of the centering portions and the resilient portion corresponding thereto is located between an uppermost end and a lowermost end of the regulating face in a direction along the rotation axis, and the resilient portion energizes the centering portion onto the regulating face via the connection portion.

In still another embodiment, each of the centering portions and the resilient portion corresponding thereto are formed by bending one blade spring.

In still another embodiment, each of the resilient portions has a first bent part and a second bent part which is more distant from the rotation axis than the first bent part, the first bent part is located above the uppermost end of the regulating face of the turntable, and the second bent part is located below the lowermost end of the regulating face of the turntable.

In still another embodiment, each of the centering portions includes a part of a columnar surface substantially parallel to the rotation axis.

In still another embodiment, the part of the columnar surface is formed by a press process.

In still another embodiment, each of the centering portions includes a part of a prismatic surface substantially parallel to the rotation axis.

In still another embodiment, the part of the prismatic surface is formed by a bending process.

In still another embodiment, each of the centering portions is in contact with the periphery of the center hole at a bent portion formed by the bending process.

In still another embodiment, each of the resilient portions includes a portion protruding toward the rotation axis between the first bent part and the second bent part, and each of the resilient portions is engaged with the turntable at the protruding portion.

In still another embodiment, a radius of the center hole is in a range of R to (R+α), and the centering portions are in contact with the periphery of the center hole in a region defined by a circle having a radius of R and a circle having a radius of (R+2α).

In still another embodiment, the turntable is in contact with the periphery of the center hole in a region defined by a circle having a radius of (R−α) and a circle having a radius of R.

In still another embodiment, when a coefficient of friction between the information recording disk and the placing surface is denoted by μ, a total number of the centering portions is denoted by N, and an elastic force of each of the centering portions pressing the periphery of the center hole is denoted by F (gf), a relationship F×N≧83 (μ+1) is satisfied.

Thus, the invention described herein makes possible the advantage of providing a disk centering device for loading an information recording disk while satisfactorily improving the eccentricity precision.

This and other advantages of the present invention will become apparent to those skilled in the art upon reading and understanding the following detailed description with reference to the accompanying figures.

DESCRIPTION OF THE PREFERRED EMBODIMENTS

Figure 1:
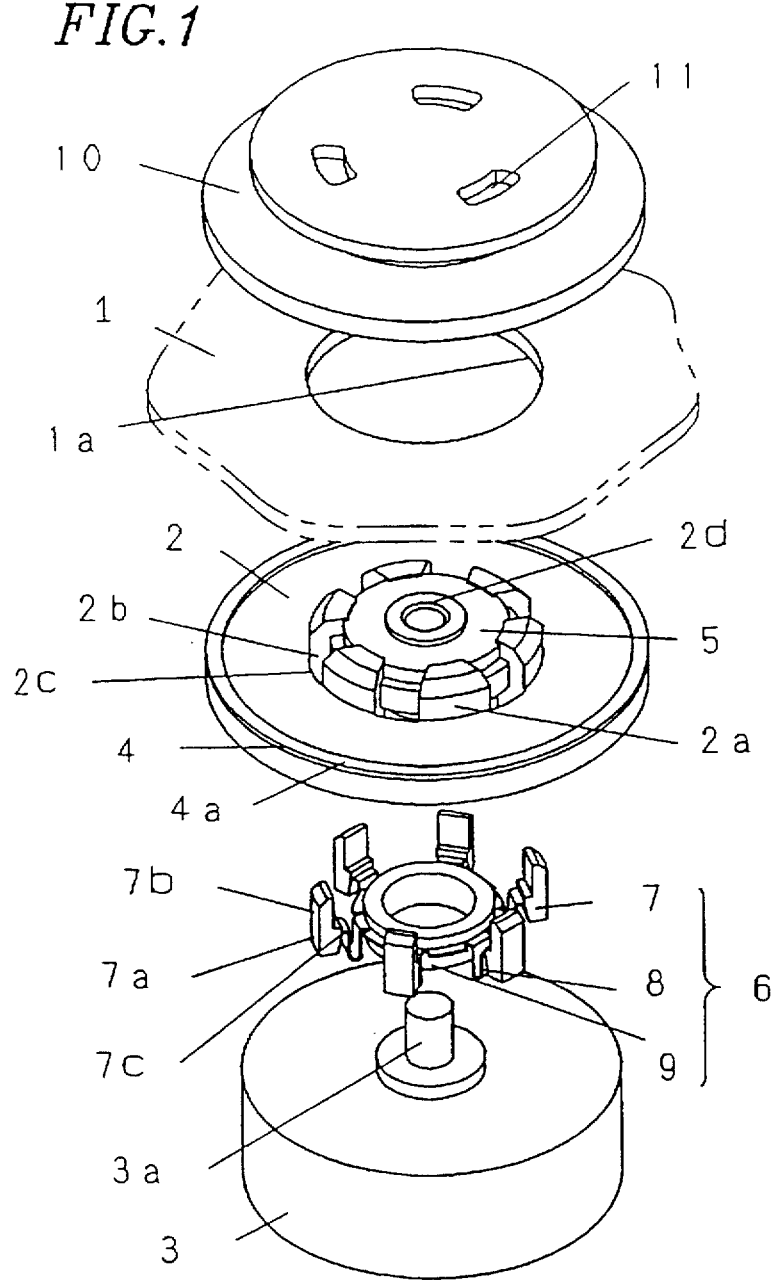
FIG. 1 is an exploded perspective view of a disk centering device according to a first example of the present invention.

Hereinafter, the present invention will be described by way of illustrative examples with reference to the accompanying drawings. Like reference numerals denote the same component.

EXAMPLE 1

Hereinafter, a first example of the present invention will be described with reference to FIGS. 1 and 2.

Figure 2:
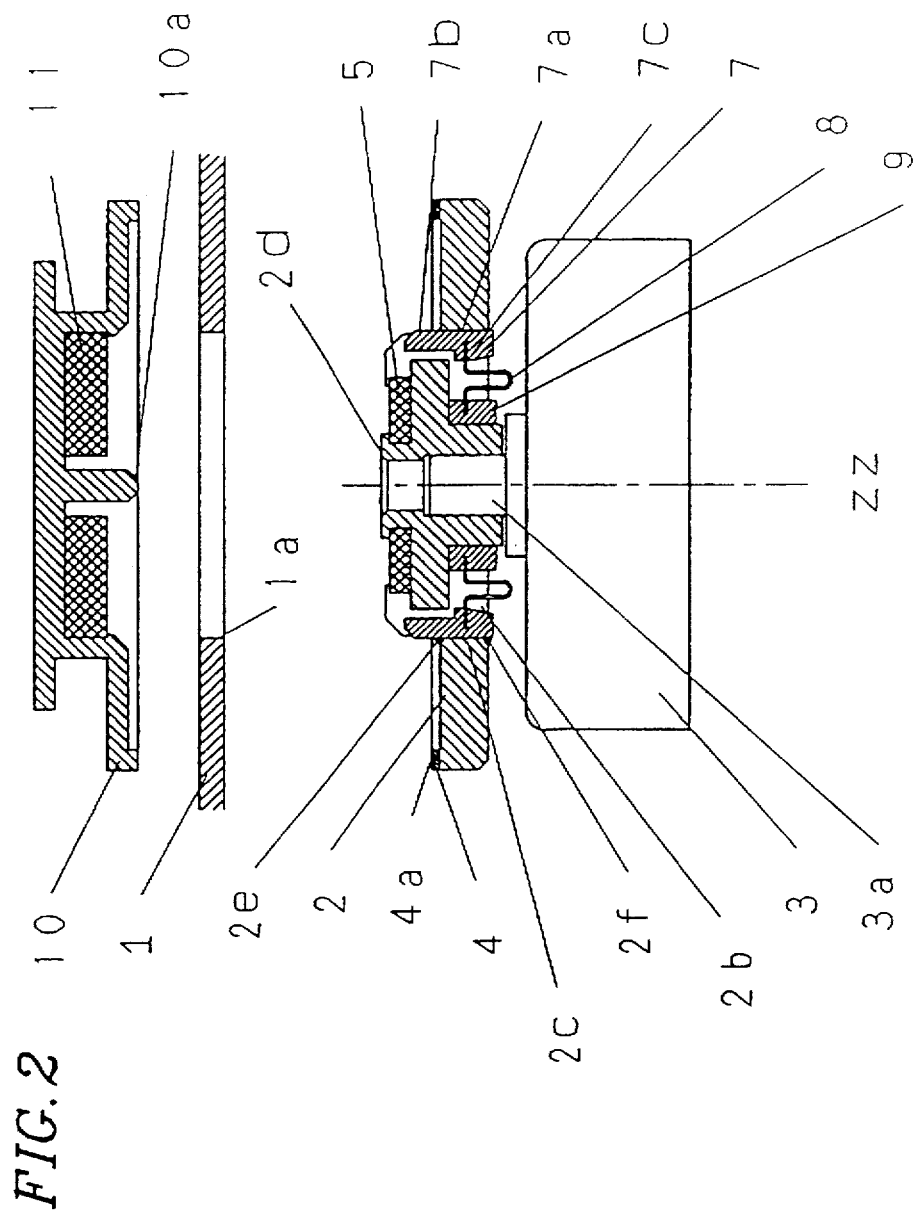
FIG. 2 is a longitudinal sectional view of the disk centering device according to the first example of the present invention.

FIG. 1 is an exploded perspective view of a disk centering device according to a first example of the present invention and FIG. 2 is a longitudinal sectional view of the disk centering device.

In FIGS. 1 and 2, an optical disk 1 such as a CD is shaped so as to have an outer diameter of 120 mm and a thickness of 1.2 mm. The optical disk 1 has an information recording layer (not shown) and a center hole having a predetermined radius ranging from 7.50 mm to 7.55 mm is provided in the center portion thereof. The periphery of the center hole is denoted by 1a.

A turntable 2 is a product formed by molding PC (polycarbonate) resin and is fit into a spindle axis 3a of a disk motor 3 so as to be fixed. An elastomer 4 in an annular shape having a width of 1 mm and a thickness of 0.4 mm is provided around the outer periphery of the turntable 2 for preventing the disk from being slid and is the surface of the elastomer 4 is used as a disk placing surface 4a. The JIS (Japanese Industrial Standard) hardness of the elastomer 4 is set to be 70° or more and the coefficient of friction thereof is set to be in the range of 0.8 to 1.5. The elastomer 4 is formed integrally with the turntable 2 by a two-color molding technique. A magnetic plate 5 for clamping the disk is further formed integrally with the turntable 2 by an insert molding technique. A columnar surface 2a with the end tapered is formed in the center portion of the turntable 2 for guiding and positioning a disk when the disk is inserted. The columnar surface 2a is formed in a cylindrical shape so as to have a radius of 7.49 mm and is provided with six cutaway portions 2b having the same shape so that adjacent cutaway portions 2b are separated from each other by 60 degrees along the circumferential direction. In each cutaway portion 2b, a regulating face 2c is formed of a part of the cylindrical face having a radius of 7.53 mm from the rotation center axis zz of the turntable 2 and is formed by appropriately designing a parting line of a metal mold so that no flash is formed at least in the direction orthogonal to the rotation center axis zz of the turntable 2. In FIG. 2, the uppermost end of the regulating face 2c is denoted by 2e and the lowermost end of the regulating face 2c is denoted by 2f. In this example, the uppermost end 2e and the lowermost end 2f of the regulating face indicate the two points which are most distant from each other in the contact region between the regulating face 2c and a regulating face contact part 7a of a centering unit 6 along the rotation center axis zz of the turntable 2.

The centering unit 6 includes: six centering portions 7; resilient portions 8 formed of blade springs which are bent in an approximately U shape and provided at the six positions corresponding to the respective centering portions 7; and a base portion 9. Each centering portion 7 is connected with each resilient portion 8 at a connection portion 7c, and each resilient portion 8 supports each centering portion 7 so that the centering portion 7 can be resiliently displaced in a centripetal direction with respect to the rotation center axis zz of the turntable 2. Moreover, the centering portion 7 can freely vary the inclination angle thereof around the connection portion 7c and is provided so that the regulating face contact part 7a can be easily fit with the regulating face 2c when the centering portion 7 comes into contact with the regulating face 2c. The upper part of the centering portion 7 is located on the free end side which is more distant from the connection portion 7c than the regulating face contact part 7a and a part on the free end side is used as a disk contact part 7b which comes into contact with the periphery 1a of the center hole of the optical disk 1. The outer peripheral surface of the centering portion 7 is formed in a cylindrical shape and the radius of curvature of the outer peripheral surface is set to be 7.3 mm, slightly smaller than that of the regulating face 2c or that of the periphery 1a of the optical disk 1, in order to ensure that the regulating face contact part 7a and the disk contact part 7b are located along a generating line of the outer peripheral surface, respectively. A tapered surface is formed on the upper end of the centering portion 7 and is used as an insertion guide for the optical disk 1. The resilient portion 8 is formed by bending a phosphorus bronze plate and is formed integrally with the centering portion 7 and the base portion 9 by an insert molding technique.

The centering unit 6 is inserted into the turntable 2 from the lower surface side thereof during the assembly and is fixed by press-fitting the base portion 9 into the turntable 2. The positional relationship between the centering unit 6 and the turntable 2 in the height direction (or the direction along the rotation center axis zz of the turntable) can be exactly determined by press-fitting the base portion 9 until the upper surface of the base portion 9 comes into contact with the turntable 2. In this case, the connection portion 7c between the centering portion 7 and the resilient portion 8 is located at an intermediate point between the uppermost end 2e and the lowermost end 2f of the regulating face 2c of the turntable 2 in the direction along the rotation center axis zz of the turntable.

When the regulating face contact part 7a comes into contact with the regulating face 2c of the turntable, each centering portion 7 is displaced toward the rotation center axis zz of the turntable in the centripetal direction by 1 mm as compared with the natural state and the regulating face contact part 7a of the centering portion 7 is pressure-fit with the regulating face 2c of the turntable because of the elastic recovery force of the resilient portion 8. The resilient portion 8 energizes the centering portion 7 onto the regulating face 2c via the connection portion 7c located at an intermediate point between the uppermost end 2e and the lowermost end 2f of the regulating face as described above. Therefore, the position and the inclination posture of the centering portion 7 are determined so as to ensure that the centering portion 7 is fit with the regulating face 2c.

In a state where the respective members are positioned in the above-described manner, the disk contact part 7b of the centering portion 7 vertically protrudes from the plane including the disk placing surface 4a and comes to be located on the circumference having a radius of 7.53 mm from the rotation center axis zz of the turntable.

In the state where the regulating face contact part 7a of the centering portion 7 is pressure-fit with the regulating face 2c of the turntable, the elastic force generated by the resilient portion 8 is set so that a horizontal force of 50 gf in the centrifugal direction is generated at the disk contact part 7b of each centering portion 7. Here, "1 gf" denotes force which the gravity applies to an object having 1 g. As described above, the horizontal force is generated by the 1 mm displacement of the centering portion 7. Therefore, if the force is represented as a spring constant, then the force corresponds to 50 gf/mm. In actuality, since a part of the elastic force generated by the resilient portion 8 is always received by the regulating face 2c, the elastic force itself generated by the resilient portion 8 becomes stronger than 50 gf, i.e., about 110 gf.

A clamper 10 has a magnet 11 and is provided with a protruding portion 10a with the end tapered at the center thereof. A clamper guide face 2d in a tapered shape for guiding the protruding portion 10a is provided for the turntable 2. In the state where the optical disk 1 is clamped, the magnet 11 is attracted to the magnetic plate 5, so that a clamping force of 250 gf is generated.

In the disk centering device having the above-described configuration, since the regulating face contact part 7a of the centering portion 7 is pressed onto the regulating face 2c of the turntable 2 by the elastic force of the resilient portion 8 in the horizontal direction, the position and the posture of the centering portion 7 can be precisely determined. In addition, since the disk contact part 7b is provided on the free end side so as to be more distant from the connection portion 7c than the regulating face contact part 7a, the positional precision of the disk contact part 7b can be determined only by the positional precision of the regulating face 2c of the turntable 2 and the surface precision of the regulating face contact part 7a, so that a high precision can be easily attained. In general, it is difficult to obtain a process precision for a resilient portion 8 and the shape of the resilient portion 8 is variable because of the deformation. However, according to the present invention, the position of the disk contact part 7b can be reproduced stably and with high precision without being affected by the size error of the resilient portion 8 at all. As a result, an optical disk 1 can be loaded while improving the eccentricity precision.

In addition, in this example, since the magnitude of the centering force (the force for returning an optical disk 1 to a center position when the disk is centered) is substantially equal to that of the elastic force of the centering portion 7 (the force exerted by the centering portion 7 on the optical disk 1 at the disk contact part 7b for resiliently thrusting the periphery 1a of the center hole of the optical disk 1 toward the outer periphery), a centering force large enough to obtain a high eccentricity precision can be generated.

Hereinafter, this point will be described in detail.

First, in the case where the radius of the center hole of the optical disk 1 is equal to or larger than the radius (7.53 mm) of the circumference on which the disk contact part 7b is located and is in the range of 7.53 mm to 7.55 mm, a maximum gap of 0.02 mm (=20 μm) exists on one side between the periphery 1a and the disk contact part 7b. Therefore, a maximum eccentricity of ± 20 μm is allowed when the optical disk 1 is loaded. However, it is surely possible to prevent an eccentricity exceeding this value. The reason is as follows. If the optical disk 1 tries to have an eccentricity exceeding this value, then the periphery 1a comes into contact with the disk contact part 7b of any centering portion 7. However, since the periphery 1a on the opposite side does not comes into contact with anything, the elastic force of the centering portion 7 is acted on the optical disk 1 as a centering force directly. This centering force is considerably larger than the centering force to be applied as an uncancelled force in the equilibrium state of the respective elastic forces in a conventional device. As a result, it is surely possible to reduce the eccentricity of the optical disk 1 to a predetermined value or less.

Next, the case where the radius of the center hole of the optical disk 1 is in the range of 7.51 mm to 7.53 mm will be described. In this case, the disk contact part 7b is displaced in the centripetal direction (maximum value on one side: 20 μm) and contacts the periphery 1a. However, if the optical disk 1 tries to have an eccentricity exceeding 20 μm, then balance between any centering portion 7 and the periphery 1a is lost. Then, the elastic force of the centering portion 7 which is still balanced with the periphery 1a is acted on the optical disk 1 as a centering force directly in the same way as in the above-described case, so that it is also surely possible to reduce the eccentricity of the optical disk 1 to a predetermined value or less.

Finally, the case where the radius of the center hole of the optical disk 1 is in the range of 7.50 mm to 7.51 mm will be described. The radius of the columnar surface 2a is 7.49 mm. Therefore, by contacting the columnar surface 2a with the periphery 1a, it is also possible to reduce the eccentricity of the optical disk 1 to 20 μm or less. However, even when no columnar surface 2a is provided, it is obvious that the eccentricity of the disk 1 can be reduced to 30 μm or less with high precision.

The above-described function will be generalized below. The minimum radius of a center hole of an information recording disk is assumed to be denoted by $R$ and the maximum radius thereof is assumed to be denoted by $R+\alpha$. If a disk contact part 7b is located on a circumference having a radius larger than the minimum radius $R$ but smaller than the maximum radius $R+\alpha$ from the rotation center axis zz of the turntable with respect to this disk, then the conditions for obtaining a high centering force (only one side of the periphery 1a is in contact with the centering portion 7 and the other side of the periphery 1a is not in contact with the periphery 1a even when the eccentricity is $\alpha$ or less) are realized, so that it is surely possible to reduce the eccentricity error in loading the disk to the variation value $\alpha$ of the radius of the center hole of the disk or less. To the contrary, in a conventional device, since the centering force is small, it is extremely difficult to reduce the eccentricity error in loading the disk to the variation value $\alpha$ of the radius of the center hole of the disk or less, as described above.

On the other hand, even when the radius of the circumference on which the disk contact part 7b is located is larger than $R+\alpha$ but smaller than $R+2\alpha$, it is effectively possible to reduce the eccentricity error in loading the disk to $\alpha$ or less at least for an information recording disk having a radius of the center hole which is closer to the maximum radius of $R+\alpha$ based on the same principle as that described above. Furthermore, in the case where the radius of the columnar surface 2a is set to be larger than $R-\alpha$ but smaller than the radius $R$, it is effectively possible to reduce the eccentricity error to $\alpha$ or less for an information recording disk having a radius of the center hole which is closer to the minimum radius $R$. Therefore, by making the columnar surface 2a and the centering unit 6 collaborate, it is also possible to realize a high eccentricity precision for a disk.

In addition, since the resilient portion 8 is formed of a metallic blade spring in this example, the internal resilient force is not decreased with the passage of time unlike a resin spring and it is possible to maintain a stable elastic force even when the resilient portion 8 is left for a long time. Moreover, in this example, the centering portions 7, the resilient portions 8 and the base portion 9 are integrally molded by an insert molding technique. Accordingly, it is possible to substantially equalize a relative positional precision of the centering portions 7 and the base portion 9 with that of a resin product integrally molded without being affected by the size error of the resilient portion 8 generally formed by a bending process which is unlikely realize a high precision, and it is possible to make uniform the elastic forces of the respective centering portions 7.

EXAMPLE 2

Hereinafter, a second example of the present invention will be described with reference to FIGS. 3 and 4.

Figure 3:
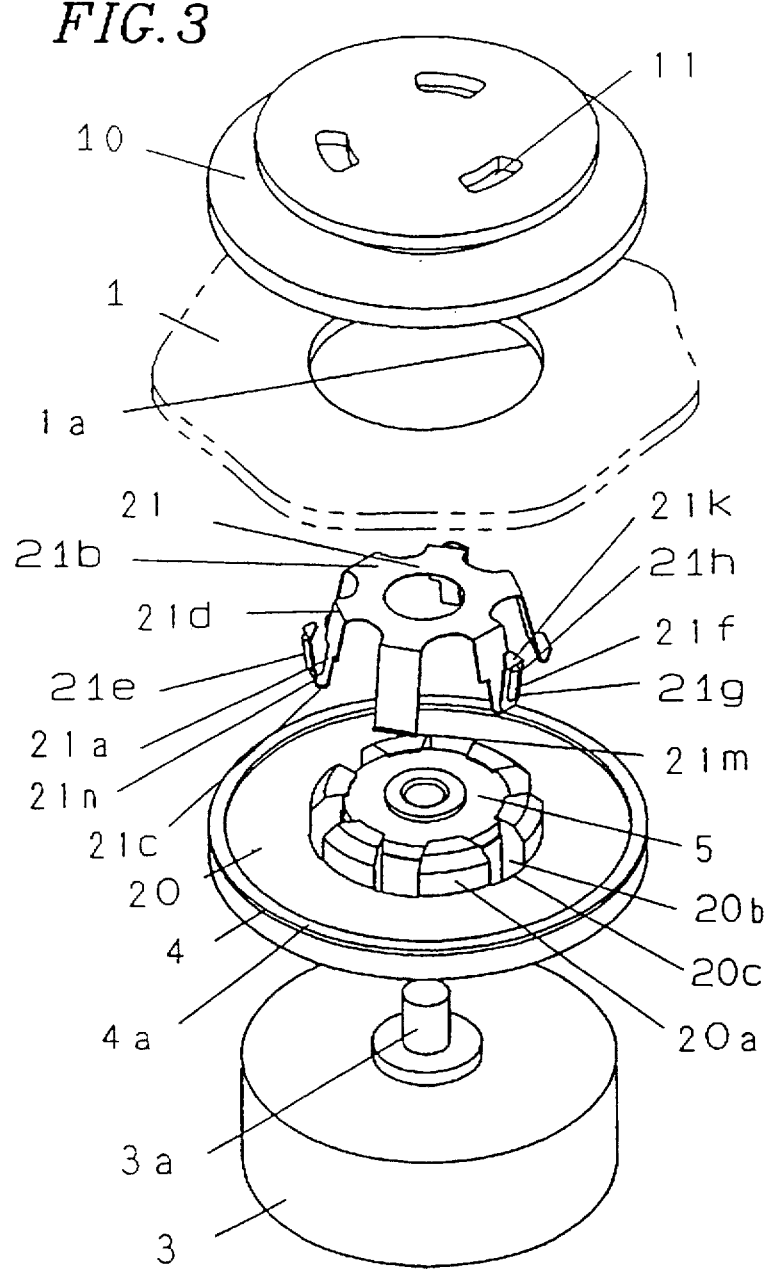
FIG. 3 is an exploded perspective view of a disk centering device according to a second example of the present invention.
Figure 4:
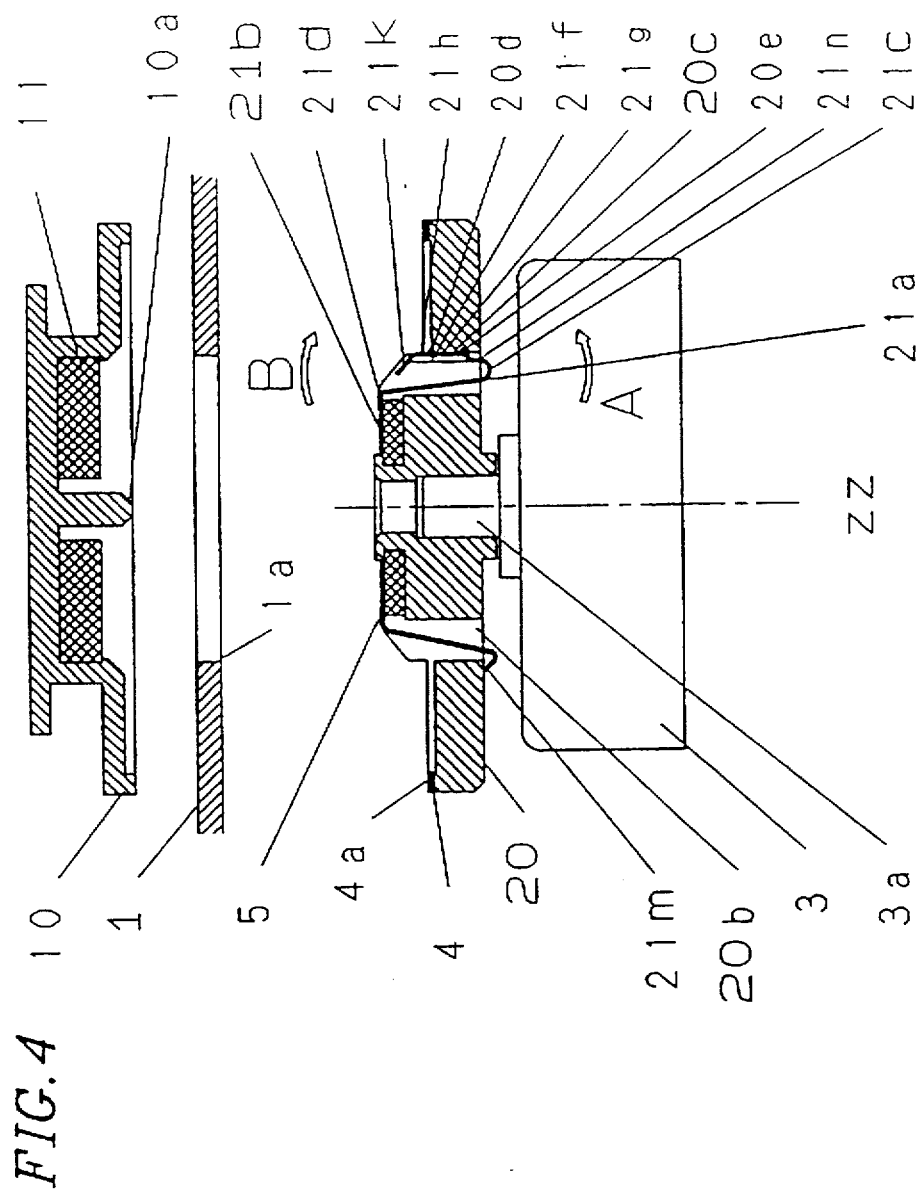
FIG. 4 is a longitudinal sectional view of the disk centering device according to the second example of the present invention.

FIG. 3 is an exploded perspective view of a disk centering device according to a second example of the present invention and FIG. 4 is a longitudinal sectional view of the disk centering device.

In FIGS. 3 and 4, an optical disk 1, a disk motor 3, an elastomer 4, a magnetic plate 5, a clamper 10, and a magnet 11 are the same as those described in the first example of the present invention.

A columnar surface 20a having a radius of 7.49 mm is formed in the turntable 20 and is provided with six cutaway portions 20b so that adjacent cutaway portions 20b are separated from each other by 60 degrees along the circumferential direction. Each cutaway portion 20b is provided with a regulating face 20c having a radius of 7.53 mm. In FIG. 4, the uppermost end of the regulating face 20c is denoted by 20d and the lowermost end of the regulating face 20c is denoted by 20e. In this example, the uppermost end 20d and the lowermost end 20e of the regulating face indicate the two points which are most distant from each other in the contact region between the regulating face 20c and a regulating face contact part 21g of a centering unit 21 along the rotation center axis zz of the turntable 20.

The centering unit 21 is formed by bending processing a stainless steel plate SUS301-CSP having a thickness of 0.15 mm. Three resilient portions 21a are connected with a base portion 21b so as to be separated from each other by 120 degrees. Each resilient portion 21a is formed in an approximately rectangular shape having a variable width in two stages, that is to say, the width of the resilient portion 21a on a side closer to a first bent part 21c is 1.2 mm while the width of the resilient portion 21a on a side closer to a second bent part 21d is 2.5 mm. The resilient portion 21a is formed so that the second moment of area in the vicinity of the first bent part 21c becomes smaller than the second moment of area in the vicinity of the second bent part 21d. The centering portion with a width of 1.6 mm to be connected with the resilient portion 21a at a connection portion 21n is denoted by 21e. By forming a protruding portion 21f with a height of 0.3 mm in the center of the centering portion 21e by a bead process, the second moment of area of the centering portion 21e becomes considerably larger than that of the resilient portion 21a, so that the centering portion becomes substantially rigid. The protruding portion 21f is formed in a cylindrical shape having a radius of 0.3 mm in the outer periphery thereof. The upper end and the lower end of the protruding portion 21f are formed in a spherical shape with two shoulders having a radius of 0.3 to 0.5 mm in the outer periphery thereof. The lower part of the cylindrical protruding portion 21f is used as a regulating face contact part 21g which comes into contact with the regulating face 20c of the-turntable while the upper part thereof is used as a disk contact part 21h which comes into contact with the periphery 1a of the center hole of the optical disk. That is to say, the disk contact part 21h is provided on the free end side so as to be more distant from the connection portion 21n than the regulating face contact part 21g. A guide portion 21k is further provided so as to be overlapped with the spherical part on the upper end of the protruding portion 21f and is used as a tapered face for guiding a disk when the disk is inserted.

The base portion 21b of the centering unit 21 is provided with three turntable engaging portions 21m so as to exist alternately with the resilient portions 21a along the circumferential direction and to be separated from each other by 120 degrees. During the assembly, the centering unit 21 is inserted into the turntable 20 from the upper surface side thereof, and fixed thereon by engaging the respective ends of the turntable engaging portions 21m with the bottom surface of the turntable 20.

In a natural state where no force is externally applied, an angle of about 102 degrees is formed between the base portion 21b and the resilient portion 21a in the vicinity of the second bent part 21d, and the centering portion 21e is inclined in the centrifugal direction by three degrees with respect to the rotation center axis zz of the turntable, that is to say, the disk contact part 21h is more distant from the rotation center axis zz than the regulating face contact part 21g. When the centering unit 21 is loaded onto the turntable 20, the regulating face contact part 21g comes into contact with the regulating face 20c of the turntable 20. As a result, the centering portion 21e is displaced toward the centripetal direction and fit with the regulating face 20c in parallel with the rotation center axis zz of the turntable.

Hereinafter, the reasons why the centering portion 21e is stably fit with the regulating face 20c will be described with reference to FIG. 4. The first bent part 21c is located below the lowermost end 20e of the regulating face 20c and the second bent part 21d is located above the uppermost end 20d of the regulating face 20c. Therefore, when the centering portion 21e comes into contact with the regulating face 2c and a press force is acted on the centering portion 21e, the resilient portion in the vicinity of the first bent part 21c makes the centering portion 21e rotate in a direction A while the resilient portion in the vicinity of the second bent part 21d makes the centering portion 21e rotate in a direction B. Rotation torques to be generated to the directions A and B, respectively, become different depending upon the points to which the press force is exerted. When the press force is exerted to the uppermost end 20d of the regulating face, the torque to the direction A becomes maximum and the torque to the direction B becomes minimum. As a result, a rotational force can be generated around the uppermost end 20d of the regulating face so as to thrust the regulating face contact part 21g onto the regulating face 20c. On the other hand, when the press force is exerted onto the lowermost end 20e of the regulating face, the torque to the direction A becomes minimum and the torque to the direction B becomes maximum. As a result, a rotational force can be generated around the lowermost end 20e of the regulating face so as to thrust the regulating face contact part 21g onto the regulating face 20c. These results indicate that it is possible to find conditions for stably fitting the centering portion 21e with the regulating face 20c irrespective of the division ratio at which the press force is divided to be applied to the uppermost end 20d and the lowermost end 20e. In this example, by designing the resilient portion 21a and the centering portion 21e in the shape and with the size mentioned above, the ratio of the press force to be applied to the uppermost end 20d and the lowermost end 20e is set to be 1:1, i.e., these portions are designed so that an equal press force is applied to the two points. Accordingly, even when the application ratio of the press force is varied to a certain degree because of the size error of the centering unit 21 or the like, it is possible to stably fit the centering portion 21e with the regulating face 20c.

As described above, the centering portion 21e can be positioned so as to ensure that the centering portion 21e is fit with the regulating face 20c. In addition, the free end side which is more distant from the connection portion 21n of the centering portion 21e than the regulating face contact part 21g is designed to protrude through the plane including the disk placing surface 4a and the disk contact part 21h is provided on the free end side. As a result, it is possible to precisely position the disk contact part 21h on the circumference having a radius of 7.53 mm from the rotation center axis zz of the turntable without being affected by the size precision of the resilient portion 21a.

In the state where the regulating face contact part 21g of the centering portion 21e is pressure-fit with the regulating face 20c of the turntable 20, the elastic force generated by the resilient portion 21a is set so that a horizontal force of 100 gf in the centrifugal direction is generated at the disk contact part 21h of each centering portion 21e. Therefore, if the force is represented as a spring constant, then the force corresponds to 100 gf/mm.

The above-described disk centering device has a configuration in which a simple centering unit 21 formed by bending a metal plate is used. However, by locating the first bent part 21c below the lowermost end 20e of the regulating face and the second bent part 21d above the uppermost end 20d of the regulating face, the centering portion 21e can be positioned so as to ensure that the regulating face contact part 21g fits with the regulating face 20c of the turntable 20. In addition, since the disk contact part 21h is provided on the free end side of the centering portion 21e, the positional precision of the disk contact part 21h is not affected at all by the size error of the resilient portion 21a even when the error is large. Therefore, by precisely positioning the regulating face 20c of the turntable 20, it is possible to precisely reproduce the positional precision of the disk contact part 21h without being affected by the size precision of the resilient portion 21a.

EXAMPLE 3

Hereinafter, a third example of the present invention will be described with reference to FIGS. 5 and 6.

Figure 5:
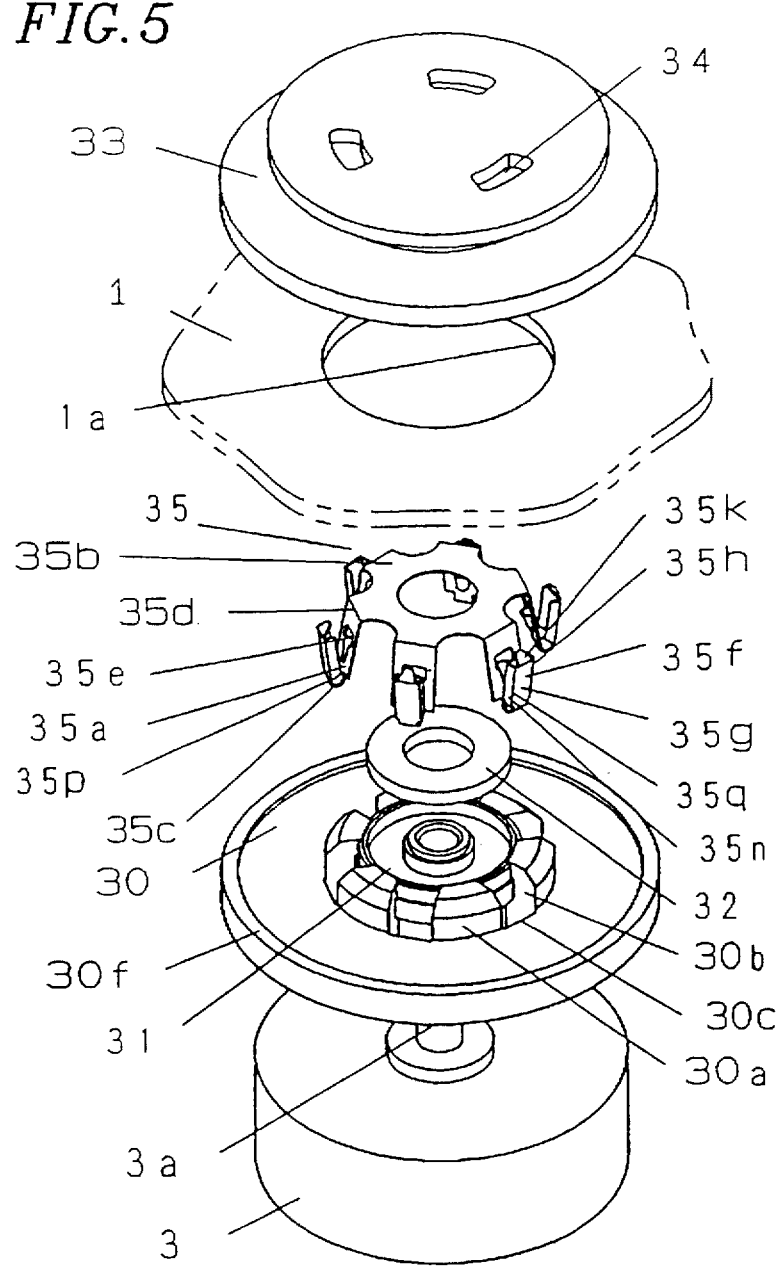
FIG. 5 is an exploded perspective view of a disk centering device according to a third example of the present invention.
Figure 6:
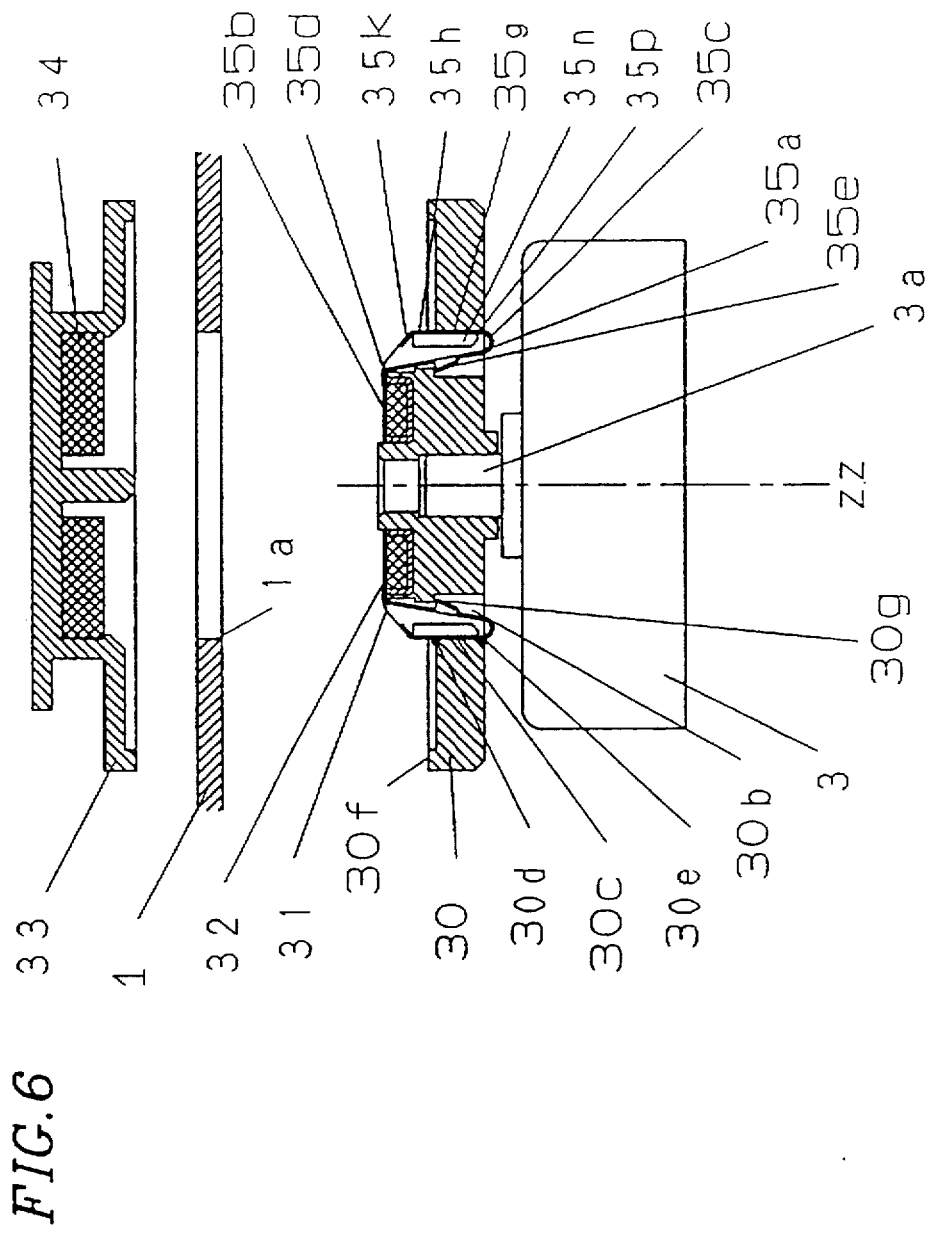
FIG. 6 is a longitudinal sectional view of the disk centering device according to the third example of the present invention.

FIG. 5 is an exploded perspective view of a disk centering device according to a third example of the present invention and FIG. 6 is a longitudinal sectional view of the disk centering device.

In FIGS. 5 and 6, an optical disk 1 and a disk motor 3 are the same as those described in the first example of the present invention.

A turntable 30 has a disk placing surface 30f and a back yoke 31 made of soft iron is integrally formed with the turntable 30 by an insert molding technique. A columnar surface 30a having a radius of 7.49 mm is formed in the turntable 30 and six cutaway portions 30b having the same shape are provided so as to be separated from each other by 60 degrees along the circumferential direction. Each cutaway portion 30b is provided with a planar regulating face 30c which is distant from the rotation center axis zz of the turntable 30 by 7.5 mm. In FIG. 6, the uppermost end of the regulating face 30c is denoted by 30d while the lowermost end of the regulating face 30c is denoted by 30e.

A magnet 32 is a multipole magnetized rare earth magnet and clamps the optical disk 1 by collaborating with a magnetic plate 34 attached to a clamper 33. During assembly, the magnet 32 is fixed by the absorption force with the back yoke 31, and intervenes between a centering unit 35 to be assembled by a snap-fitting technique and the turntable 30. Therefore, it is not necessary to perform an adhesion process or the like and is unlikely to be released from the turntable 30.

The centering unit 35 is formed by bending processing a non-magnetic stainless steel plate SUS304CSP having a thickness of 0.12 mm. Six resilient portions 35a are connected with a base portion 35b so as to be separated from each other by 60 degrees. Each resilient portion 35a is formed in an approximately rectangular shape having a variable width in two stages, that is to say, the width of the resilient portion 35a on a side closer to a first bent part 35c is 1.2 mm while the width of the resilient portion 35a on a side closer to a second bent part 35d is 2.8 mm. A protruding portion 35e protruding toward the direction of the rotation center axis zz of the turntable is formed in a part of the rectangular portion having a width of 2.8 mm by drawing. The lower end portion of the protruding portion 35e is smoothly connected with the resilient portion 35a. When the centering unit 35 is loaded onto the turntable 30, the protruding portion 35e is inserted without being hooked by the turntable 30. However, once the centering unit 35 has been loaded onto the turntable 30, the protruding portion 35e is engaged with an engaging portion 30g of the turntable 30 and is fixed. A centering portion 35f having a width of 1.6 mm is connected with the resilient portion 35a at a connection portion 35p, and has an approximately U-shaped cross section by bending both side portions 35n toward the direction parting away from the regulating face 30c. The lower part of the centering portion 35f is used as a regulating face contact part 35g which comes into contact with the regulating face 30c of the turntable 30 while the upper part of the bent portion 35q connected with both side portions 35n is used as a disk contact part 35h which comes into contact with the periphery 1a of the center hole of the optical disk. The disk contact part 35h is located on the circumference having a radius of 7.53 mm from the rotation center axis zz of the turntable. A guide portion 35k is provided on the upper end of the centering portion 35f and is used as a tapered surface for guiding a disk when the disk is inserted.

In the state where the regulating face contact part 35g of the centering portion 35f is pressure-fit with the regulating face 30c of the turntable 30, the elastic force generated by the resilient portion 35a is set so that a horizontal force of 50 gf in the centrifugal direction is generated at the disk contact part 35h of each centering portion 35f.

In the disk centering device having the above-described configuration, since a high linear precision can be attained for a bent portion 35q of the centering portion 35f by performing a bending process, the disk contact part 35h and the regulating face contact part 35g which are formed in the bent portion 35q have a high linear precision in the direction along the bent portion 35q. Therefore, when the bent portion 35q is fit with the regulating face 30c of the turntable 30, it is possible to precisely position the disk contact part 35h.

In this example, the centering portion 35f has an approximately U-shaped cross section made by bending. However, the cross section form is not limited to the U-shape. The centering portion 35f preferably has a V-shaped cross section by bending the center of the centering portion 35f so as to have a single bent portion. Compared to the U-shaped cross section, the V-shaped cross section enables contact with the periphery 1a at smaller areas, thereby making the contact a more stable one.

Moreover, in this example, the respective members of the centering unit 35 from the first bent part 35c to the regulating face contact part 35g are smoothly connected with each other and function as a guide plane in loading the centering unit 35 onto the turntable 30. Therefore, by performing a simple forcing operation from above, it is impossible to load the centering unit 35 onto the turntable 30 easily without causing any hook.

In this example, the disk placing surface 30f is provided at a level higher than the uppermost end 30d of the regulating face by 0.4 mm along the rotation center axis zz of the turntable. Alternatively, this distance may be a shorter one, or the disk placing surface 30f and the uppermost end 30d of the regulating face may exist on the same plane.

Finally, the relationship between the elastic force of a centering portion 7, 21e or 35f thrusting the periphery 1a of the optical disk 1 in the horizontal direction and the variation of the eccentricity in loading the optical disk 1 will be described with reference to FIG. 7. This relationship is true of all the foregoing examples.

Figure 7:
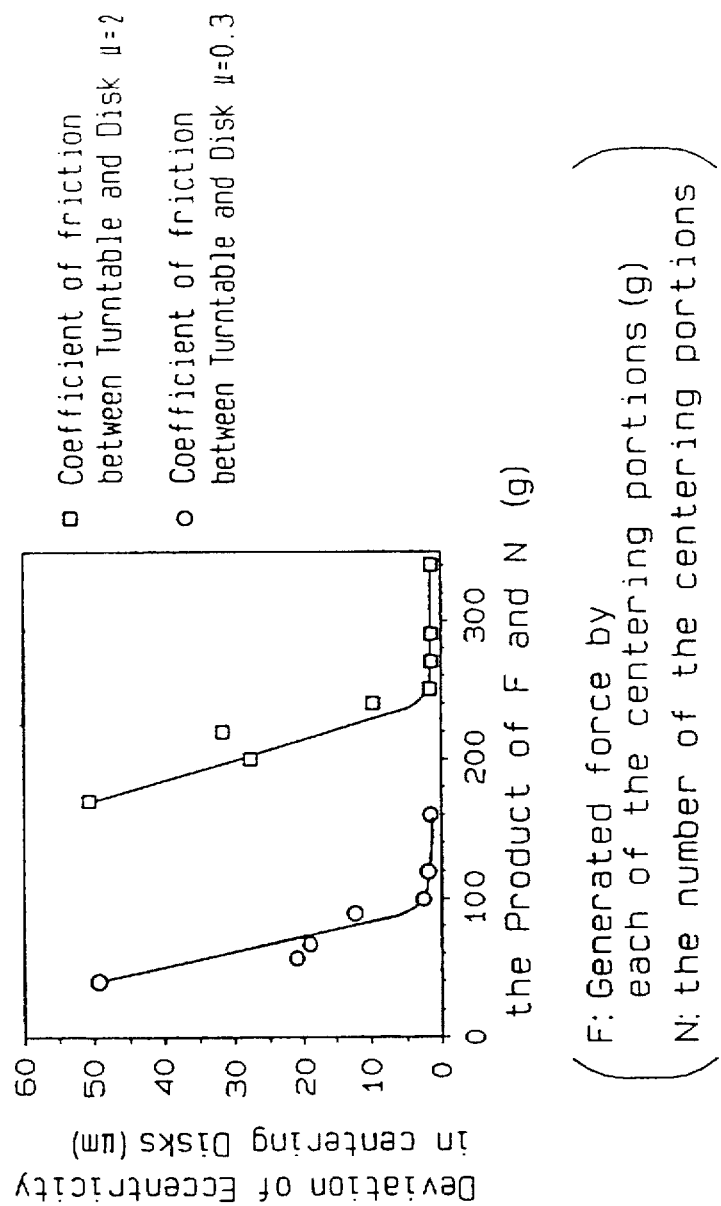
FIG. 7 is a graph showing relationship between the elastic forces of centering portions thrusting the periphery of an optical disk in a horizontal direction and the variation of the eccentricity in loading the optical disk based on the experimental results.
Figure 8:
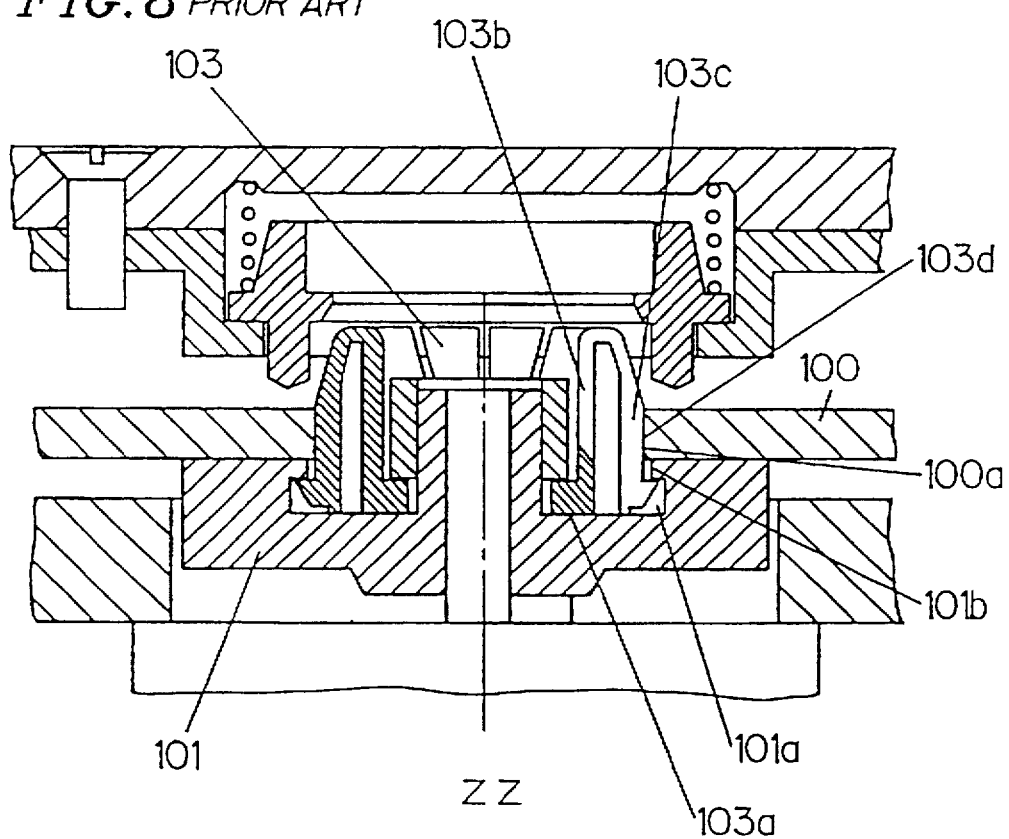
FIG. 8 is a cross-sectional view showing an exemplary configuration for a conventional disk centering device.
Figure 9A:
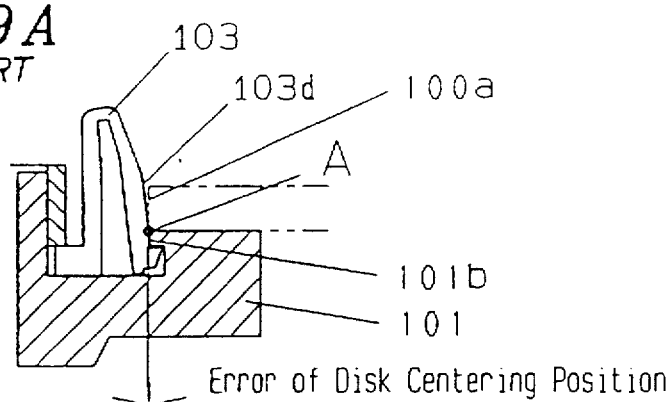
FIGS. 9A to 9C are cross-sectional views illustrating the contact states of a resilient claw 103 and a turntable 101 in a conventional disk centering device.
Figure 9B:
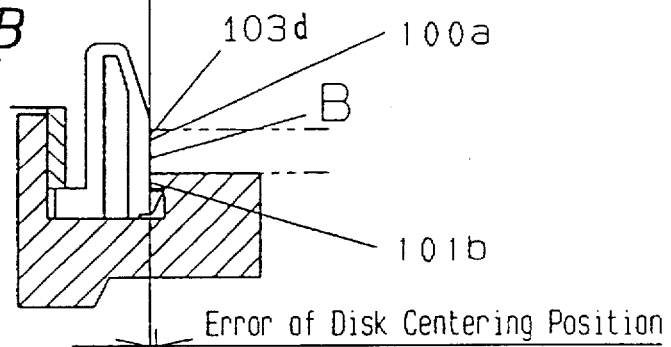
Figure 9C:
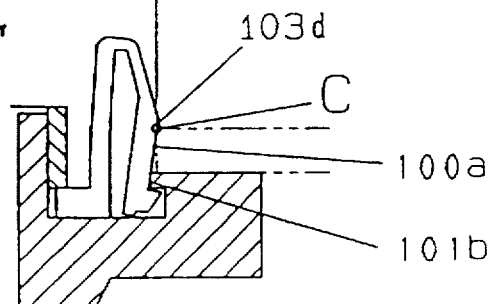

FIG. 7 is a graph showing the relationship between the elastic force of the centering portion thrusting the periphery of the optical disk in the horizontal direction and the variation of the eccentricity in loading the optical disk based on the experimental results. A compact disk which is made of PC resin and has an outer diameter of 120 mm, a thickness of 1.2 mm and a radius of center hole of 7.53 mm was employed as an optical disk for the experiment. The estimation apparatus is not shown in the drawings. In performing this estimation, the elastic force of the centering portion can be set at an arbitrary value, the disk contact part of the centering portion is located on the same circumference of the center hole having a radius of 7.53 mm of the disk, and an initial gap between the periphery of the optical disk and the centering portion is set to be substantially zero. In addition, the increase in the elastic force owing to the deformation of the centering portion is relatively small. More specifically, if the force is represented by a spring constant, the increase is equal to 50 gf/mm or less.

In FIG. 7, the abscissas indicate the product F×N obtained by multiplying together the elastic force F (gf) of each centering portion thrusting the periphery of the optical disk in the horizontal direction and a total number N of the centering portions. For example, as described in the third example, each centering portion 35f generates an elastic force F of 50 gf at the disk contact part 35h in the horizontal direction and the total number N of the centering portions 35f is six. Accordingly, F×N=300 g in this case.

On the other hand, the ordinates indicate the. variation of the eccentricity in loading the opticaldisk 1. In actually performing the experiment, the optical disk was repeatedly loaded onto the estimation apparatus 50 times under the same conditions and then the variation of the loading positions was measured. Then, the variation was represented as a standard deviation.

In the case where a turntable is made of a metal or a resin, the coefficient $\mu$ of the friction between an optical disk and a disk placing surface of the turntable is generally 0.3 or less. As shown in FIG. 7, when $\mu$=0.3, the variation of the eccentricity in loading the disk can be remarkably suppressed if F×N is 100 gf or more, in particular.

On the other hand, in the case where the turntable is an elastomer plane, the coefficient $\mu$ of the friction between an optical disk and a disk placing surface of the turntable is generally 2.0 or less. As shown in FIG. 7, when $\mu$=2.0, the variation of the eccentricity in loading the disk can be remarkably suppressed if F×N is 250 gf or more, in particular.

In general, if the coefficient $\mu$ of the friction between an optical disk and a disk placing surface of a turntable, the elastic force F (gf) of each centering portion thrusting the periphery of the optical disk, and a total number N (pieces) of the centering portions satisfy the following relationship, $$F \times N \geq 83 \, (\mu+1)$$

the variation of the eccentricity in loading the disk can be suppressed remarkably.

In the foregoing examples of the present invention, $\mu$ is equal to or smaller than 1.5 and the elastic force F is set so that F×N=300 gf. Therefore, since the above relationship is satisfied, the optical disk can be loaded with a remarkably high eccentricity precision. In addition, since the friction load between the periphery 1a and the centering portion is the only insertion load applied to the optical disk 1 and is as small as about 90 g when the coefficient of friction is 0.3, the friction load does not prevent an ordinary clamping operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk centering device comprising:

a turntable for retaining an information recording disk wherein the information recording disk has a center hole and is placed on a placing surface of the turntable so that the disk can rotate around a rotation axis thereof; and a centering means comprising a plurality of centering portions coming into contact with a periphery of the center hole and a plurality of resilient portions, each of the resilient portions is connected with a corresponding one of the plurality of centering portions for supporting the centering portion so that the centering portion is resiliently displaced in a radial direction of the information recording disk, wherein the turntable comprises regulating faces for regulating positions of the centering portions in a state where the centering portions are resiliently displaced in the radial direction as a result of a contact between a regulating face contact part of the centering portions and the regulating faces, and wherein each of the centering portions is in contact with the periphery of the center hole at a disk contact part, a distance between the disk contact part and the resilient portion being greater than a distance between the regulating face contact part and the resilient portion.

2. A disk centering device according to claim 1, wherein the centering portions are made of a resin material, the resilient portions are made of a metallic spring material, and the centering portions and the resilient portions are integrally formed by an insert molding.

3. A disk centering device according to claim 1, wherein a connection portion between each of the centering portions and the resilient portion corresponding thereto is located between an uppermost end and a lowermost end of the regulating face in a direction along the rotation axis, and wherein the resilient portion energizes the centering portion onto the regulating face via the connection portion.

4. A disk centering device according to claim 1, wherein each of the centering portions and the resilient portion corresponding thereto are formed by bending one blade spring.

5. A disk centering device according to claim 4, wherein each of the resilient portions has a first bent part and a second bent part which is more distant from the rotation axis than the first bent part, the first bent part is located above the uppermost end of the regulating face of the turntable, and the second bent part is located below the lowermost end of the regulating face of the turntable.

6. A disk centering device according to claim 5, wherein each of the centering portions comprises a part of a columnar surface substantially parallel to the rotation axis.

7. A disk centering device according to claim 6, wherein the part of the columnar surface is formed by a press process.

8. A disk centering device according to claim 5, wherein each of the centering portions comprises a part of a prismatic surface substantially parallel to the rotation axis.

9. A disk centering device according to claim 8, wherein the part of the prismatic surface is formed by a bending process.

10. A disk centering device according to claim 9, wherein each of the centering portions is in contact with the periphery of the center hole at a bent portion formed by the bending process.

11. A disk centering device according to claim 5, wherein each of the resilient portions comprises a portion protruding toward the rotation axis between the first bent part and the second bent part, and wherein each of the resilient portions is engaged with the turntable at the protruding portion.

12. A disk centering device according to claim 1, wherein a radius of the center hole is in a range of R to (R+α), and wherein the centering portions are in contact with the periphery of the center hole in a region defined by a circle having a radius of R and a circle having a radius of (R+2α).

13. A disk centering device according to claim 12, wherein the turntable is in contact with the periphery of the center hole in a region defined by a circle having a radius of (R−α) and a circle having a radius of R.

14. A disk centering device according to claim 1, wherein, when a coefficient of friction between the information recording disk and the placing surface is denoted by μ, a total number of the centering portions is denoted by N, and an elastic force of each of the centering portions pressing the periphery of the center hole is denoted by F (gf), a relationship F×N≧83 (μ+1) is satisfied.

* * * * *